(12) United States Patent
Zhang

(10) Patent No.: US 8,433,748 B2
(45) Date of Patent: Apr. 30, 2013

(54) METHOD, TERMINAL, SERVER AND SYSTEM FOR PROCESSING NOTIFICATION MESSAGE

(75) Inventor: Jie Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 457 days.

(21) Appl. No.: 12/413,286

(22) Filed: Mar. 27, 2009

(65) Prior Publication Data

US 2009/0240767 A1 Sep. 24, 2009

Related U.S. Application Data

(63) Continuation of application No. PCT/CN2007/002843, filed on Sep. 28, 2007.

(30) Foreign Application Priority Data

Sep. 29, 2006 (CN) .......................... 2006 1 0140661

(51) Int. Cl.
*G06F 15/16* (2006.01)
*G06F 15/177* (2006.01)
*G06F 15/173* (2006.01)

(52) U.S. Cl.
USPC .............................. 709/203; 709/220; 709/223

(58) Field of Classification Search ................... 709/203, 709/220, 223
See application file for complete search history.

(56) References Cited

U.S. PATENT DOCUMENTS

| | | | | |
|---|---|---|---|---|
| 6,012,100 | A * | 1/2000 | Frailong et al. | 709/250 |
| 7,836,137 | B2 * | 11/2010 | Jalobeanu et al. | 709/206 |
| 2004/0030738 | A1 * | 2/2004 | Haydock | 709/200 |
| 2004/0098715 | A1 * | 5/2004 | Aghera et al. | 717/173 |
| 2005/0286517 | A1 * | 12/2005 | Babbar et al. | 370/389 |
| 2006/0047769 | A1 * | 3/2006 | Davis et al. | 709/207 |
| 2006/0053450 | A1 * | 3/2006 | Saarikivi et al. | 725/46 |
| 2006/0123099 | A1 * | 6/2006 | Paila et al. | 709/219 |
| 2008/0189376 | A1 * | 8/2008 | Bice et al. | 709/206 |

OTHER PUBLICATIONS

"IP Datacast over DBV-H : Notification" ETSI. Sep. 2006.
International Preliminary Report on Patentability issued in corresponding PCT Application No. PCT/CN2007/002843; issued Mar. 31, 2009.
Office Action issued in corresponding Chinese Patent Application No. 200610140066l.X; issued Apr. 13, 2010.
Supplementary European Search Report issued in corresponding European Patent Application No. 07 81 6457; issued Feb. 23, 2010.
Office Action issued in corresponding Chinese Patent Application No. 200610140661.X, mailed Apr. 19, 2011.

(Continued)

*Primary Examiner* — Minh-Chau Nguyen
(74) *Attorney, Agent, or Firm* — Brinks Hofer Gilson & Lione

(57) ABSTRACT

A method, terminal, server and system for processing the notification message are disclosed. According to the method, the server transmits the notifying message with description information. The description information contains the parameter; the terminal parses the notifying message after receiving the notifying message. The description message may contain one or more parameter, thereby providing more messages through the notifying message to the terminal, making the terminal user getting the wanted information quickly. After the description message is added to the notifying message, the terminal can perform a variety of processes on the received notifying message.

11 Claims, 7 Drawing Sheets

OTHER PUBLICATIONS

Office Action issued in corresponding European Patent Application No. 07816457.1, mailed Dec. 8, 2011.
Martinez, "Liaison Statement" Digital Video Broadcasting Open Mobile Alliance, Mar. 3, 2006.
ETSI DVB, "Digital Video Broadcasting (DVB); IP Datacast over DVB-H: Electronic Service Guide (ESG)" ETSI TS102 471, V.1.1.1, Apr. 2006.

* cited by examiner

METHOD, TERMINAL, SERVER AND SYSTEM FOR PROCESSING NOTIFICATION MESSAGE

CROSS-REFERENCE TO RELATED APPLICATIONS

The present application is a continuation of International Application No. PCT/CN2007/002843, filed Sep. 28, 2007, which claims the benefit of Chinese Patent Application No. 200610140661.X, filed Sep. 29, 2006, both of which are hereby incorporated by reference in their entireties.

FIELD OF THE INVENTION

The present invention relates to mobile communication technologies, and in particular, to a method, terminal, server and system for processing a notification message.

BACKGROUND OF THE INVENTION

After decades of years of development, more and more people benefit from the mobile communication. However, the services provided by the mobile communication are still mainly voice services and message services. With the rapid development of the Internet, a large number of multimedia services come forth, and people are gradually requiring that the multimedia services can be supported by the mobile communication. Some multimedia applications provided by the Internet require that multiple terminal users receive the same data simultaneously, such as the mobile video, television broadcasting, video conference, online education and interaction game. The mobile video gradually becomes a hot subject at home and abroad.

In the present mobile video technology, an important technology is the application layer technology which is independent from the bearer network. The application layer technology includes aspects such as audio/video encoding of the channel content, electronic service guide (ESG), content protection technology as well as service authentication, user management and charging. The relevant standardization organizations include the Convergence of Broadcast and Mobile Service (CBMS) work group of the Digital Video Broadcast (DVB) organization, the Broadcast (BCAST) work group of the Open Mobile Alliance (OMA) organization, etc. With the application layer technology, the available contents of the IP programs on the Internet may be used directly and broadcast to terminal users via a broadcast network, so that the existing content resources may be protected to the greatest extent.

FIG. 1 is a schematic diagram showing an implementation of the networking of the broadcast service in the prior art. As shown in FIG. 1, a broadcast application server locates in the IP network and is connected to a broadcast network via IP encapsulation equipment (IPE), so as to realize key functions such as real-time program broadcasting, assembling and transmitting of the electronics service guide, encrypting of the program contents and transmitting of the notification message. A client operating server connected to an exchange network is adapted to provide program purchasing information for the terminal user, receive and process the purchasing request of the user and provide service for the user. The terminal has the capability of accessing the broadcast network and exchange network simultaneously. The DVB-H technology, T-DMB technology and so on may be employed in the broadcast network, and the Code Division Multiple Access (CDMA) technology, Global System for Mobile Communication (GSM) technology and so on may be employed in the exchange network. Different notification service servers broadcast notification messages of the corresponding services to the terminal via the broadcast application server.

The electronic service guide (ESG) is constituted by a plurality of different fragments according to the internal logic relations of these fragments. As shown in FIG. 2, the purchase item and purchase channel belong to the service provision, whereas the service bundle, service, schedule event and content belong to the service core, and the service acquisition and session description belong to the service access, where the session description does not belong to the fragments. With respect to different implementations, the structure of ESG may be different. The specific meaning of each fragment in FIG. 2 is as shown in Table 1. The line connection relations between the fragments represent the corresponding relations between different fragments. For example, the relation between the service and schedule event is that one service fragment may correspond to 0 to n fragments of the schedule event.

TABLE 1

Example of specific meanings of the fragments

| Fragments of ESG | Meaning |
| --- | --- |
| Service Bundle | Collection of services, which is corresponding to the purchase item |
| Service | Collection of services |
| Service Acquisition | Fragment of Service Acquisition is associated with the session description of the transmission stream of program content and indicates the distribution manner. For a terminal, the Service Acquisition indicates the method and approach to access the transmission stream of program content |
| Schedule Event | Time table of the content or service |
| Content | The content or program included in a service |
| Purchase Item | Purchase unit visible to a terminal user |
| Purchase Channel | Approach and address for purchasing the purchase item |

A notification is used to send messages to the terminal user in a mobile broadcast system to notify the terminal user of events that are about to happen, and the terminal user or terminal performs a corresponding processing. The messages include, but not limited to: message of emergencies; notification message relevant to the system, such as a message for notifying the terminal user that a function of the system fails; event message relevant to a program, such as relevant material of a program actor; and notification message of software update, etc.

The notification message broadcasted has a fixed structure, and the terminal can only obtain values of some fixed parameters such as service identification and time in the notification message according to the structure of the notification message, and use these values of the fixed parameters to implement specific functions such as filtering the notification message. However, because the parameters that can be carried in the notification message are very limited, and these parameters can only be fixed parameters, the information obtained by the terminal user from the notification message is very limited. Furthermore, when the terminal user configures the filtering condition, only these fixed parameters may be used as the filtering condition. Thus, the configuration of the filtering condition is limited by the fixed parameters contained in the notification message, the terminal user is not able to configure the filtering condition flexibly, and the individual demands of the terminal user cannot be satisfied.

Moreover, because the parameters contained in the notification message are very limited, the terminal user cannot quickly obtain the value of the parameter concerned, such as the value of a parameter relevant to the notification message. Thus, the notification message cannot be processed flexibly.

SUMMARY OF THE INVENTION

Various embodiments of the present invention provide a method, terminal, server and system for processing a notification message, so that more information may be provided for the terminal user via the notification message. Further, the terminal and the server cooperate with each other to implement various processing for the notification message.

A method for processing a notification message according to an embodiment of the present invention includes: sending, by a server, a notification message carrying description information to a terminal, where the description information includes a parameter; and parsing, by the terminal, the notification message according to the parameter.

A terminal for processing a notification message according to an embodiment of the present invention includes: a receiving unit, adapted to receive a notification message carrying description information, where the description information includes a parameter; and a processing unit, adapted to parse the notification message according to the parameter.

A server for processing a notification message according to an embodiment of the present invention includes: a message generating unit, adapted to add description information into the notification message; and a sending unit, adapted to send the notification message carrying the description information.

A system for processing a notification message according to an embodiment of the present invention includes a server and a terminal. The server is adapted to add description information into the notification message, and send the notification message to the terminal; and the terminal is adapted to parse the notification message received according to a parameter contained in the description information.

In the embodiments of the present invention, the server sends a notification message carrying description information to the terminal, where the description information includes a parameter. When receiving the notification message, the terminal parses the notification message according to the parameter, where one or more parameters may be included in the description information, so that more information may be provided for the terminal via the notification message, and the terminal may promptly obtain the information required.

Further, when the description information is added in the notification message, the terminal may perform various processing on the received notification message, and realize various new functions on the terminal. For example, the terminal may implement filtering of the notification message with the filtering rules stored, the terminal user may configure the filtering rules satisfying the individual requirements of the terminal user himself, and the terminal may determine whether the parameter value in the notification message satisfies the filtering rules stored when receiving a message of a notification service, and processing the notification message accordingly, such as only store or display the notification in which the terminal user is interested. The terminal user may configure the filtering rules according to a filtering condition list containing a plurality of parameters, or the terminal or user may configure the filtering rules according to one or more parameters in the description information and the relationship between the parameters. Because various parameters may be contained in the description information, the filtering rules obtained in the embodiments of the present invention are flexible and diversified.

DETAILED DESCRIPTION OF THE EMBODIMENTS

In an embodiment of the present invention, a server sends a notification message carrying description information to a terminal. When receiving the notification message, the terminal processes the notification message according to parameters contained in the description information. One or more parameters may be included in the description information. The description information carried in the notification message may be structured description information, i.e., the description information includes the structure and content of the description information. Alternatively, the structure of description information may be provided to the terminal in advance, so that the description information carried in the notification message only includes the content of the description information, and the content of the description information may only be parameter values.

In a specific embodiment when the description information carried in the notification message is the structured description information, the server may use parameter information to constitute the description information according to a configured structure, and send the description information with the configured structure to the terminal. The server may structure the description information according to the format of a parameter list. The data structure of the parameter list is as shown in Table 2.

TABLE 2

Schematic data structure of structured description information

| Parameter | Type | Occurrence Number | Meaning | Data Type |
|---|---|---|---|---|
| ParameterList | E | 0...1 | Parameter list | NA |
| ParameterNumber | A | 1 | Parameter number | Integer, which indicates the number of parameters |
| Parameter | E1 | 0...N | Parameter | NA |
| ParameterIdentifierLength | E2 | 1 | Length of parameter identifier | Integer |
| ParameterIdentifier | E2 | 1 | Parameter identifier | Character string, the length of which is specified by ParameterIdentifierLength |
| ParameterEncoding | E2 | 1 | Type of parameter value | Character string with a fixed length, which defines the encoding mode and character string of ParameterValue, where following types are included: string, signed short, long, Boolean, float, double and date |
| ParameterValueLength | E2 | 1 | Length of parameter value | Integer |
| ParameterValue | E2 | 1 | Parameter value | Character string, the encoding mode is specified by ParameterEncoding, and the length is determined by ParameterValueLength |

In the above table, E represents Element, A represents Attribute, E1 represents a first layer element, E2 represents the sub-element of the first layer element, and the rest may be deduced by analogy.

Figure 1:
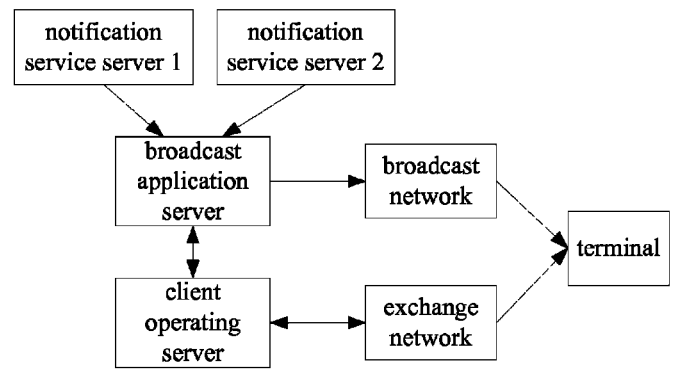
FIG. 1 is a schematic diagram showing a networking for implementing a broadcast service in the prior art.
Figure 2:
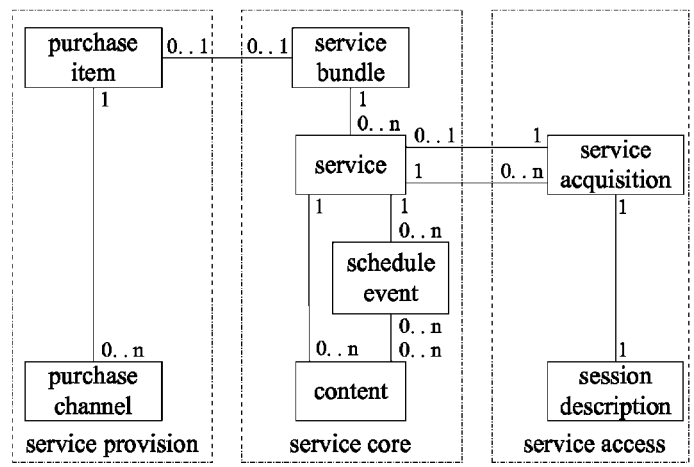
FIG. 2 is a schematic diagram showing an ESG model in the prior art.
Figure 3:
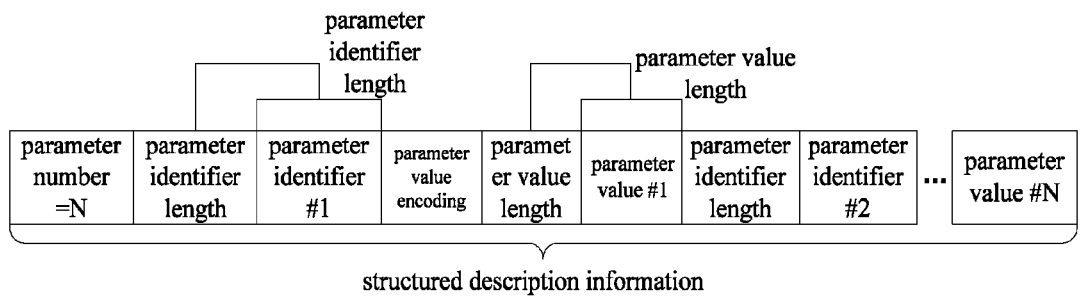
FIG. 3 is a schematic diagram showing structured description information according to an embodiment of the present invention.

FIG. 3 illustrates structured description information according to an embodiment of the present invention. As shown in FIG. 3, in combination with Table 2, the description information with the configured structure includes N parameters. The value of ParameterIdentifierLength determines the byte length occupied by the ParameterIdentifier, and the value of ParameterValueLength determines the byte length occupied by the ParameterValue. When receiving the notification message carrying the structured description information, the identifier of each parameter and the corresponding parameter value are determined according to the configured structure of the description information.

Alternatively, the server may also send the structure of the description information to the terminal in advance, and the terminal stores the structure of the description information. In the subsequent procedure, only the content of the description information is carried in the notification message sent to the terminal by the server. When the notification message is received, the terminal may process the content of the description information, such as determine the parameter value corresponding to the parameter identifier in the structure of the description information, according to the stored structure of the description information.

The server may send relevant information of the structure of the description information to the terminal with the data structure RelatedMaterial in the existing ESG.

When the server sends the relevant information of the structure of the description information to the terminal with the data structure RelatedMaterial, two modes, i.e., Pull mode and Push mode, may be employed. The Pull mode is initiated by the terminal. The terminal obtains the address of the structure of the description information with the parameter MediaLocator of ESG, and submits application to the server. Then the server sends the structure of the description information to the terminal according to the application of the terminal. The Push mode is initiated by the server. The server puts the structure of the description information in the ESG and sends the ESG to the terminal via the broadcast network.

Specifically, the process of sending relevant information of the structure of the description information to the terminal with the data structure RelatedMaterial may be implemented in following three modes.

Mode I: The server performs configuration to make the parameter MediaLocator in the data structure RelatedMaterial include the structure of the description information, and then sends the data structure RelatedMaterial to the terminal. The terminal obtains the structure of the description information from the parameter MediaLocator in the received data structure RelatedMaterial directly, and stores the structure of the description information. The structure of the description information may be included in the parameter MediaLocator of the data structure RelatedMaterial of the service fragment, or may be included in the parameter MediaLocator of the data structure RelatedMaterial of the content fragment, or may be included in the parameter MediaLocator of respective data structure RelatedMaterial of the service fragment and content fragment simultaneously. This mode is referred to as the Push mode.

Figure 4:
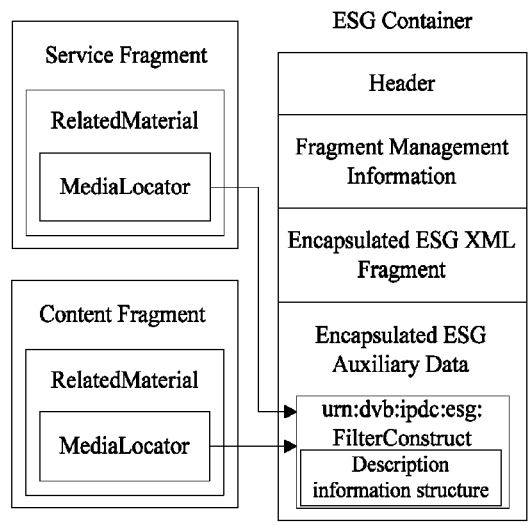
FIG. 4 is a schematic diagram showing that a terminal obtains the structure of description information via a parameter MediaLocator according to an embodiment of the present invention.

Mode II: The server performs configuration to make a file in the structure of Auxiliary Data of ESG include the structure of the description information, performs configuration to make the parameter MediaLocator in the data structure RelatedMaterial include Uniform Resource Identifier (URI) of the file, and then sends the data structure RelatedMaterial to the terminal. The terminal obtains the URI through the parameter MediaLocator of the received data structure RelatedMaterial, finds the file corresponding to the URI in the structure of Auxiliary Data according to the URI, and obtains the structure of the description information from the file. For example, as shown in FIG. 4, the structure of the description information is configured in a file of the structure of Auxiliary Data of ESG by the server. The URI of this file is metadataURI="urn:dvb:ipdc:esg:FilterConstruct". The parameter MediaLocator in the data structure RelatedMaterial sent to the terminal by the server includes a URI, this URI="urn:dvb:ipdc:esg:FilterConstruct". When receiving the data structure RelatedMaterial, the terminal obtains the URI in the parameter MediaLocator, finds the corresponding file in the structure of Auxiliary Data according to the URI, obtains the structure of the description information from the file, and stores the structure of the description information. The URI may be included in the parameter MediaLocator of the data structure RelatedMaterial of the service fragment, or may be included in the parameter MediaLocator of the data structure RelatedMaterial of the content fragment, or may be included in the parameter MediaLocator of respective data structure RelatedMaterial of the service fragment and content fragment simultaneously. This mode is referred to as the Push mode.

Mode III: The server performs configuration to make a file in the server include the structure of the description information, performs configuration to make the parameter MediaLocator in the data structure RelatedMaterial include a Uniform Resource Locator (URL) of effective "http", "ftp", "rtsp" or "tftp" addresses of this file, such as http://www.kbs.co.kr/FilterConstruct.xsd, and then sends the data structure RelatedMaterial to the terminal. The terminal obtains the URL through the parameter MediaLocator of the received data structure RelatedMaterial, and accesses the server. The terminal finds the file corresponding to the URL according to the URL, and requests the server to provide this file. The server sends the file to the terminal. Finally, the terminal obtains the structure of the description information from this file and stores the structure of the description information. The URL may be included in the parameter MediaLocator of the data structure RelatedMaterial of the service fragment, or may be included in the parameter MediaLocator of the data structure RelatedMaterial of the content fragment, or may be included in the parameter MediaLocator of respective data structure RelatedMaterial of the service fragment and content fragment simultaneously. This mode is referred to as the Push mode.

In order to achieve the object that the terminal obtains the address of the structure of the description information through ESG, other parameters including (but not being limited to) Server fragment parameter may be extended except for configuring the extended parameter MediaLocator in ESG, where the Server fragment parameter may be used to carry the structure of the description information. This structure may bear an address for obtaining the specific structure of the description information, or may bear the structure of the description information itself directly.

When the structure of the description information is stored in the terminal, the notification message sent by the server to the terminal in the subsequent procedure may only carry the content of description information. When receiving the notification message, the terminal may process the content of description information according to the stored structure of the description information, such as determine the parameter value corresponding to a parameter identifier in the structure of the description information.

For example, the XML file format of the structure of the description information that is obtained and stored by the terminal is as follows:

```
<element name="MSG" type="MSGType">
<complexType name="MSGType">
    <element name="film type" type="string"/>
    <element name="actor name" type="string"/>
    <element name="film introduction" type="string"/>
</complexType>
```

The notification message sent by the server to the terminal only carries the content of description information. The XML file format of the content of description information is as follows:

```
<MSG>
    <film type> "action film" </film type>
    <actor name> "Jackie Chan" </actor name>
    <film introduction> "This story happened in ..." </film introduction>
</MSG>
```

Thus, the terminal can determine the specific parameter value of the corresponding parameter identifier in the structure of the description information according to the content of the description information received. In the practical application, the content of the description information may be only the parameter value, and the terminal determines the parameter identifier corresponding to the parameter value according to the stored structure of the description information. For example, with the help of the byte length occupied by each parameter identifier in the structure of the description information, the terminal extracts the parameter value of a corresponding length from the notification message as the parameter value of the parameter identifier corresponding to the length.

Further, when the server needs to provide more parameter information to the terminal via the notification message, it is required to send a new structure of the description information to the terminal, and the terminal processes the content of the received description information according to the new structure of the description information.

In the embodiment of the present invention, because the description information carried in the notification message may be structured description information, it is possible to provide the structure of the description information to the terminal in advance, and the description information carried in the notification message is only the parameter value. Thus, various parameters may be carried in the description information by configuring different structures of description information, so that the parameters obtained by the terminal through the description information carried in the notification message are more diversified and more flexible.

Figure 5A:
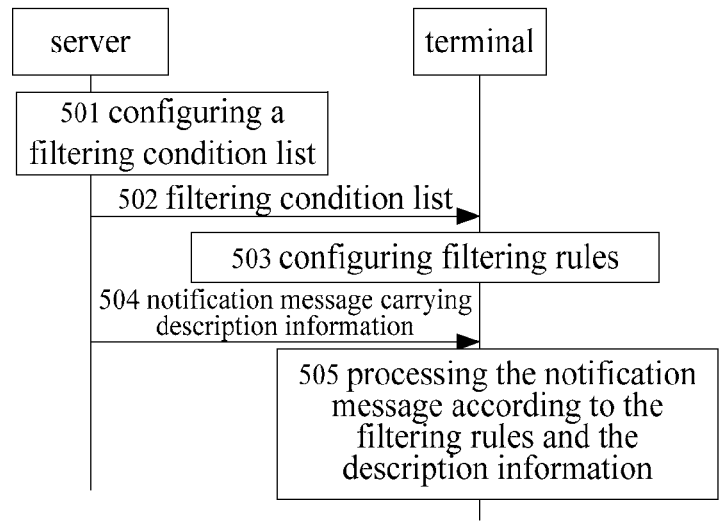
FIG. 5A is a flow chart for configuring filtering rules according to an embodiment of the present invention.

FIG. 5A shows a flow chart for configuring filtering rules according to an embodiment of the present invention. As shown in FIG. 5A, the specific processing procedure for configuring the filtering rules includes following steps:

Step 501-Step 502: A server configures a filtering condition list, and sends the filtering condition list to a terminal.

Step 503: When the terminal receives the filtering condition list, a terminal user is prompted to configure filtering conditions and a relation between the filtering conditions according to the contents in the filtering condition list. The terminal user selects the filtering conditions and configures the relation between the filtering conditions, so as to generate the filtering rules. Then the terminal stores the filtering rules. Thus, the configuration procedure of the filtering rules is finished.

It is described above that the terminal prompts the terminal user to configure the filtering rules according to the filtering condition list from the server. However, the filtering rules may also be configured and stored in the terminal by the terminal user directly. For example, the terminal user configures the filtering rules according to one or more parameters and the relation between the parameters contained in the description information, and then the terminal stores the filtering rules. Alternatively, the filtering rules may also be provided to the terminal by the server. For example, the server configures the filtering rules according to one or more parameters and the relation between the parameters contained in the description information, and provides the filtering rules to the terminal for saving.

The terminal user may configure the filtering rules according to the filtering condition list that includes a plurality of parameters, or the terminal or server may configure the filtering rules according to one or more parameters and the relation between the parameters contained in the description information. Because the parameters contained in the description information are diversified, the filtering rules obtained in the present invention are flexible and diversified.

Figure 5B:
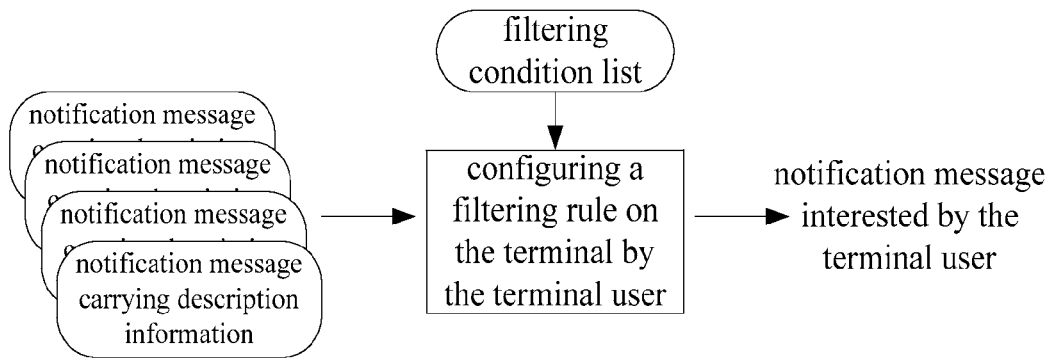
FIG. 5B is a schematic diagram showing the processing of a notification message according to the filtering rules according to an embodiment of the present invention.

Step 504-Step 505: After the filtering rules are stored, when a notification message carrying description information sent by the server is received subsequently, the terminal processes the notification message according to the stored filtering rules and the received description information, such as filtering the parameters contained in the description information according to the stored filtering rules, determining whether the parameters in the description information satisfy the filtering rules, and processing the notification message accordingly. When the parameters in the description information are filtered according to the stored filtering rules, the terminal user may directly obtain notification message in which he is more interested, as shown in FIG. 5B.

The data structure of the filtering condition list containing filtering parameters that is sent to the terminal by the server via ESG is as shown in Table 3.

TABLE 3

Schematic data structure of the filtering condition list

| Parameter | Type | Occurrence Number | Meaning | Data Type |
|---|---|---|---|---|
| Filtering-ConditionList | E | 0 . . . 1 | Filtering condition list | NA |
| FilteringConditionRelation | E1 | 1 | Relation of filtering condition | Character string, optional relations between filtering rules, which may be "not", "or", "and". This parameter may include a plurality of relations. |
| FilterCondition | E1 | 0 . . . N | Filtering condition | NA |
| FilteringInputStyle | A | 1 | Selecting mode of the filtering parameter | Character string, optional selecting modes, for example, following arbitrary strings may be included: "input by user", "selected by user in a pull down menu", "user can input or select in a pull down menu" |
| FilteringParameterIdentifier | E2 | | Identifier of filtering parameter | Character string |
| FilteringParameterOperator | E2 | 1 | Operator of filtering parameter | Character string, optional operators between the filtering parameter identifiers or values of the filtering parameters selected by the user, which may be: equals, not_equals, greater_than, greater_than_or_equal, less_than, less_than_or_equal. This parameter may include a plurality of operators. |
| FilteringParameterEncoding | E2 | 0 . . . 1 | Type of filtering parameter value | Character string, which defines the encoding mode of FilteringParameterValue, the string multimedia digital signal encoding (StringCodec) may be employed, the available types of filtering parameter value is as follows: string, signed short, long, boolean, float, double, date |
| FilteringParameterValue | E2 | 1 | Optional value of filtering parameter | Character string, the filtering parameter values available for the user to select, the encoding mode is determined by FilteringParameterEncoding. There may be arbitrary number of parameter values. |

In the above table, E represents Element, A represents Attribute, E1 represents the first layer element, E2 represents the sub-element of the first layer element, and the rest may be deduced by analogy.

The server may send the filtering condition list to the terminal with the data structure RelatedMaterial in the existing ESG.

When the server sends the filtering condition list to the terminal with the data structure RelatedMaterial, two modes, i.e., Pull mode and Push mode, may be employed. The Pull mode is initiated by the terminal. The terminal obtains the address of the filtering condition list with the parameter MediaLocator of ESG, and submits application to the server.

Then the server sends the filtering condition list to the terminal according to the application of the terminal. The Push mode is initiated by the server. The server puts the filtering condition list in the ESG and sends the ESG to the terminal via the broadcast network.

Specifically, the process of sending the structure of the description information to the terminal may be implemented in following three modes.

Mode I: The server performs configuration to make the parameter MediaLocator in the data structure RelatedMaterial include the filtering condition list, and then sends the data structure RelatedMaterial to the terminal. The terminal obtains the filtering condition list from the parameter MediaLocator in the received data structure RelatedMaterial directly, and stores the filtering condition list. The filtering condition list may be included in the parameter MediaLocator of the data structure RelatedMaterial of the service fragment, or may be included in the parameter MediaLocator of the data structure RelatedMaterial of the content fragment, or may be included in the parameter MediaLocator of respective data structure RelatedMaterial of the service fragment and content fragment simultaneously. This mode is referred to as the Push mode.

Figure 6:
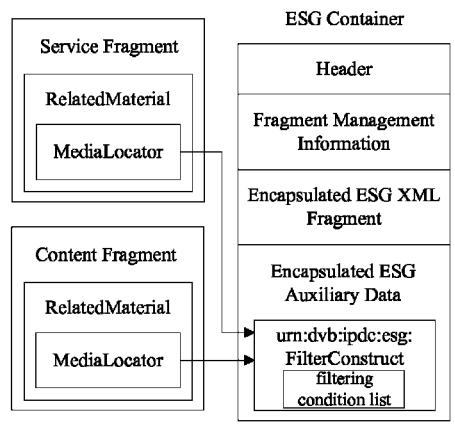
FIG. 6 is a schematic diagram showing that the terminal obtains a filtering condition list via the parameter MediaLocator according to an embodiment of the present invention.

Mode II: The server performs configuration to make a file in the structure of Auxiliary Data of ESG include the filtering condition list, performs configuration to make the parameter MediaLocator in the data structure RelatedMaterial include Uniform Resource Identifier (URI) of the file, and then sends the data structure RelatedMaterial to the terminal. The terminal obtains the URI through the parameter MediaLocator of the received data structure RelatedMaterial, finds the file corresponding to the URI in the structure of Auxiliary Data according to the URI, and obtains the filtering condition list from the file. For example, as shown in FIG. 6, the filtering condition list is configured in a file of the structure of Auxiliary Data of ESG by the server. The URI of this file is metadataURI="urn:dvb:ipdc:esg:filter". The parameter MediaLocator in the data structure RelatedMaterial sent to the terminal by the server includes a URI, this URI="urn:dvb:ipdc:esg:filter". When receiving the data structure RelatedMaterial, the terminal obtains the URI in the parameter MediaLocator, finds the corresponding file in the structure of Auxiliary Data according to the URI, obtains the filtering condition list from the file, and stores the filtering condition list. The URI may be included in the parameter MediaLocator of the data structure RelatedMaterial of the service fragment, or may be included in the parameter MediaLocator of the data structure RelatedMaterial of the content fragment, or may be included in the parameter MediaLocator of respective data structure RelatedMaterial of the service fragment and content fragment simultaneously. This mode is referred to as the Push mode.

Mode III: The server performs configuration to make a file in the server include the filtering condition list, performs configuration to make the parameter MediaLocator in the data structure RelatedMaterial include a Uniform Resource Locator (URL) of effective "http", "ftp", "rtsp" or "tftp" addresses of this file, such as http://www.kbs.co.kr/Filter.xml, and then sends the data structure RelatedMaterial to the terminal. The terminal obtains the URL through the parameter MediaLocator of the received data structure RelatedMaterial, and accesses the server. The terminal finds the file corresponding to the URL according to the URL, and requests the server to provide this file. The server sends the file to the terminal. Finally, the terminal obtains the filtering condition list from this file and stores the filtering condition list. The URL may be included in the parameter MediaLocator of the data structure RelatedMaterial of the service fragment, or may be included in the parameter MediaLocator of the data structure RelatedMaterial of the content fragment, or may be included in the parameter MediaLocator of respective data structure RelatedMaterial of the service fragment and content fragment simultaneously. This mode is referred to as the Push mode.

Hereinafter, the present invention is further illustrated by taking it as an example that the terminal determines whether the parameter in the received description information satisfies the stored filtering rules.

Figure 7A:
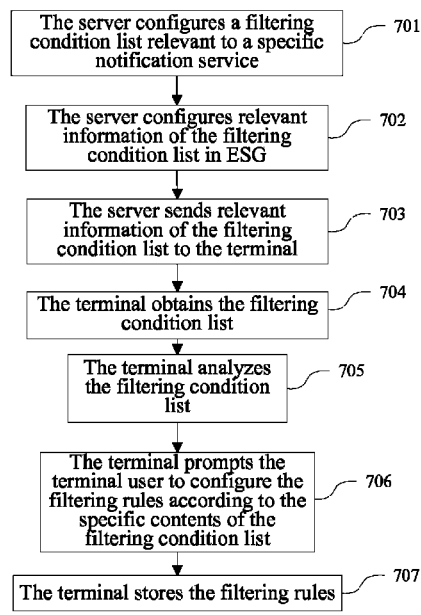
FIG. 7A is a flow chart of configuring filtering rules by the terminal according to an embodiment of the present invention.

FIG. 7A shows a flow chart of configuring the filtering rules by the terminal according to an embodiment of the present invention. As shown in FIG. 7A, the specific implementing procedure of configuring the filtering rules by the terminal according to the filtering condition list from the server includes following steps:

Step 701-Step 702: The server configures a filtering condition list relevant to a specific notification service, and configures relevant information of the filtering condition list in ESG For example, the server performs configuration to make the parameter MediaLocator of the data structure RelatedMaterial of ESG include the filtering condition list, and then provides the data structure RelatedMaterial to the terminal. Alternatively, the server performs configuration to make a file in the structure of Auxiliary Data of ESG include the filtering condition list, and provide the URI of this file to the terminal. Alternatively, the server performs configuration to make a file in the server include the filtering condition list, and provides the URL of this file to the terminal.

Step 703-Step 704: The server sends relevant information of the filtering condition list to the terminal. The terminal obtains the filtering condition list according to the received relevant information of the filtering condition list. For example, when the server performs configuration to make the parameter MediaLocator of the data structure RelatedMaterial of ESG include the filtering condition list, the terminal obtains the filtering condition list in the parameter MediaLocator directly. Alternatively, when the server performs configuration to make the parameter MediaLocator of the data structure RelatedMaterial of ESG include the URI of the file of the filtering condition list, the terminal finds the file corresponding to the URI in the structure of Auxiliary Data according to the URI in the parameter MediaLocator, and obtains the filtering condition list from the file. Alternatively, when the server performs configuration to make the parameter MediaLocator of the data structure RelatedMaterial of ESG include the URL of the file of the filtering condition list, the terminal accesses the server according to the URL in the parameter MediaLocator, and requests the server to provide this file. The server obtains the filtering condition list from the file provided by the server.

Step 705-Step 707: The terminal analyzes the filtering condition list, prompts the terminal user to configure the filtering conditions and the relation between the filtering conditions according to the specific contents of the filtering condition list, generates the filtering rules, and stores the filtering rules.

Figure 7B:
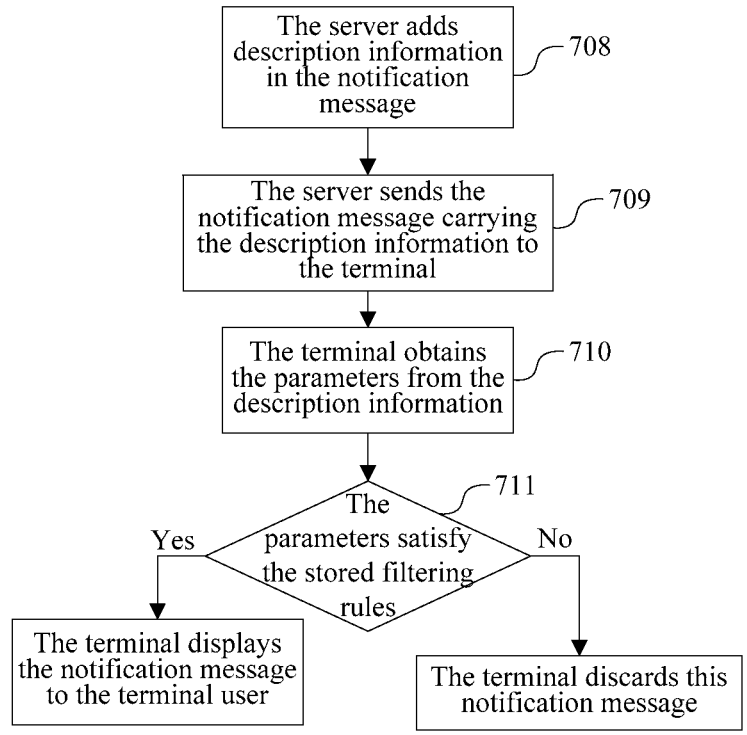
FIG. 7B is a flow chart of processing a notification message according to the filtering rules by the terminal according to an embodiment of the present invention.

FIG. 7B shows a flow chart of processing the notification message according to the filtering rules by the terminal according to an embodiment of the present invention. As shown in FIG. 7B, the specific implementing procedure of processing the notification according to the filtering rules by the terminal includes following steps:

Step 708-Step 709: The server needs to send a notification message to the terminal, the description information is added in the notification message, and then the notification message carrying the description information is sent to the terminal.

Step 710-Step 711: When receiving the notification message, the terminal obtains the parameters from the description information, and determines whether the parameters satisfy the stored filtering rules. If the parameters satisfy the stored filtering rules, the terminal displays the notification message to the terminal user; otherwise, the terminal discards this notification message directly. Thus, the notification message obtained by the terminal user is the most interesting notification message for the terminal user. When the parameters satisfy the filtering rules, the terminal may also store the notification message. If the description information satisfies a configured structure, obtaining the parameters from the description information by the terminal refers to determining the parameter value corresponding to the parameter identifier according to the configured structure. When the description information only includes the content of the description information, obtaining the parameters from the description information by the terminal refers to determining the parameter value corresponding to the parameter identifier according to the stored structure of the description information.

Figure 7C:
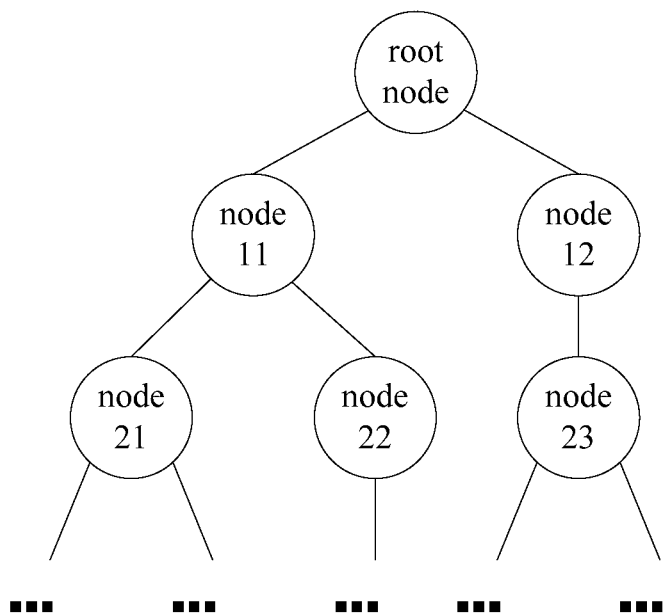
FIG. 7C is a schematic diagram showing data structure of the filtering rules stored in the terminal according to an embodiment of the present invention.

The terminal stores locally the filtering rules. The filtering rules may constitute a decision tree with respect to the data structure. As shown in FIG. 7C, the decision tree is constituted by a root node and individual sub nodes included by the root node. The top node is the root node, and the bottom nodes are leaf nodes. The root node includes a plurality of sub nodes, and the relation between each sub nodes from top to bottom is an iterative relation and/or inclusion relation. The leaf nodes refer to the nodes that have no sub nodes, and the non-leaf nodes refer to the nodes that have sub nodes. The data structure of the root node of filtering rules is as shown in Table 4.

TABLE 4

Schematic data structure of the root node of filtering rules

| Parameter | Data Type |
| --- | --- |
| Node { | Node |
|   JudgeValue | Boolean |
|   FilteringConditionRelation | Integer |
|   If(FilteringConditionRelation = null) { | |
|   } | |
|   else if(FilteringConditionRelation = operator "not") { | |
|     SingleNode | Node |
|   } | |
|   else if(FilteringConditionRelation=operator "or" or "and") { | |
|     DoubleNodeL | Node |
|     DoubleNodeR | Node |
|   } | |
| } | |

In above table, JudgeValue is a judgment value. When the node is a leaf node, the judgment value of this node is determined according to whether the filtering condition of the node is satisfied. When the node is a non-leaf node, the judgment value of this node is determined through a calculation according to the filtering condition relation based on the judgment values of individual sub-nodes. FilteringConditionRelation is the filtering condition relation. SingleNode is a single sub-node, and when the filtering condition relation is the "not" operation, the SingleNode is a corresponding node of this operation. DoubleNodeL is a left sub-node. When the filtering condition relation is the "or" or "and" operation, the corresponding node is the sub-node on the left of the operator. DoubleNodeR is a right sub-node. When the filtering condition relation is the "or" or "and" operation, the corresponding node is the sub-node on the right of the operator.

In the data structure of the node, the data structure behind the filtering condition relation is determined by the value of the filtering condition relation: when the filtering condition relation is null, SingleNode, DoubleNodeL and DoubleNodeR do not exist; when the filtering condition relation is the "not" operation, only a parameter SingleNode exists, which indicates that only one sub-node is included; when the filtering condition relation is the "or" or "and" operation, only DoubleNodeL and DoubleNodeR exist.

The judgment value of the leaf node is determined by each filtering condition. When the parameter in the description information carried in the notification message satisfies the filtering condition, the judgment value of the leaf node is "true", and when the parameter in the description information carried in the notification message does not satisfy the filtering condition, the judgment value of the leaf node is "false". The judgment value of the non-leaf node is determined by a value obtained through a filtering condition relation calculation of the judgment values of the sub-nodes included in the non-leaf node. The judgment values of the leaf nodes are inserted into the decision tree, when the judgment value obtained through calculation of the judgment values of individual nodes according to the filtering condition relation is "true", i.e., the judgment value of the root node is "true", it is indicated that the parameters in the description information satisfy the filtering rule; when the judgment value obtained through calculation of the judgment values of individual nodes according to the filtering condition relation cannot be determined or is "false", i.e., the judgment value of the root node cannot be determined or is "false", it is indicated that the parameters in the description information do not satisfy the filtering rule. In other words, the judgment value of the leaf node is determined according to whether the filtering condition of the leaf node is satisfied. When the calculation of the judgment values of the leaf nodes according to the filtering condition relation is implemented, the judgment value of the non-leaf node where the leaf nodes are located is obtained. It is determined whether the non-leaf node is the root node. If the non-leaf node is not the root node, calculation is further implemented with respect to the judgment value of the non-leaf node according to the filtering condition relation, until the judgment value of the root node is obtained, and then it is determined whether the parameters satisfy the filtering rule according to the judgment value of the root node.

Hereinafter, the present invention is illustrated more explicitly by taking the filtering of the notification message of a film playing arrangement as an example.

A terminal user subscribes for a service relevant notification from the ESG, such as a notification of the latest film playing arrangement of a cinema. The server provides the terminal with relevant information of the filtering condition list, and the terminal obtains the filtering condition list, as shown in Table 5.

TABLE 5

Schematic contents of filtering condition list

| Parameter | Data Type |
| --- | --- |
| FilteringConditionList { | |
|   FilteringConditionRelation | "not", "or", "and" |
|   FilterCondition { | |
|     FilteringInputStyle | "terminal user selects in the pull-down menu" |

TABLE 5-continued

Schematic contents of filtering condition list

| Parameter | Data Type |
|---|---|
| FilteringParameterIdentifier | "film type" |
| FilteringParameterOperator | "equal", "not equal" |
| FilteringParameterEncoding | "character string" |
| FilteringParameterValue | "action film", "disaster film", "comedy film", "horror film" |
| } | |
| FilterCondition { | |
| FilteringInputStyle | "terminal user can input or select in the pull-down menu" |

TABLE 5-continued

Schematic contents of filtering condition list

| Parameter | Data Type |
|---|---|
| FilteringParameterIdentifier | "actor name" |
| FilteringParameterOperator | "equal", "not equal" |
| FilteringParameterEncoding | "character string" |
| FilteringParameterValue | "Jackie Chan", "Jet Li" |
| } | |
| FilterCondition { | |
| FilteringInputStyle | "user input" |
| FilteringParameterIdentifier | "film introduction" |
| FilteringParameterOperator | "equal", "not equal" |
| } | |
| } | |

Figure 8A:
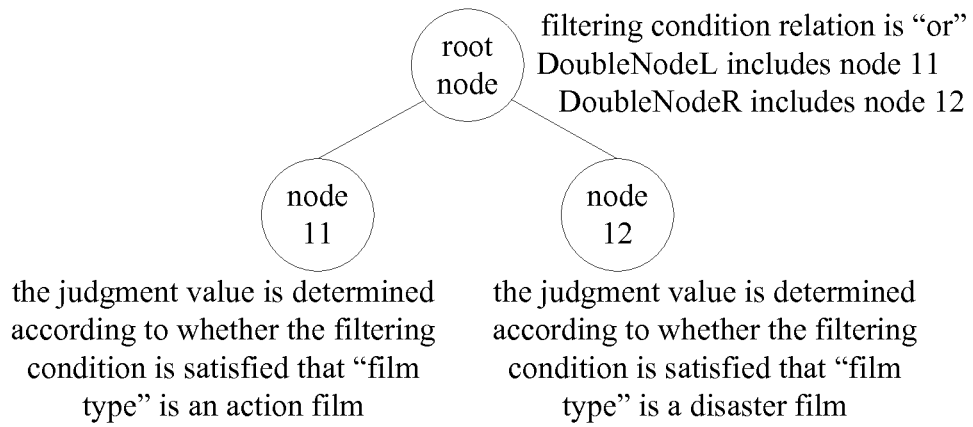
FIG. 8A shows a specific example of structure of a decision tree according to an embodiment of the present invention.

According to the specific contents in the filtering condition list, the terminal prompts the terminal user to select the filtering conditions and configure the relation among the filtering conditions. The filtering conditions that can be selected by the terminal user in the filtering condition list mainly include "film type", "actor name" and "film introduction". The terminal user is interested in the action film and disaster film, configures the "film type" twice in the filtering condition list, and sets the "film type" to be "action film" and "disaster film" respectively by performing selection in the pull-down list. Then the terminal user configures the relation between the filtering conditions. Because the terminal user is interested in both the action film and the disaster film, the filtering condition relation is set to be the operation "or". Thus, the final filtering rule is displaying "a notification message whose film type is action film or whose film type is disaster film" to the terminal user. The decision tree generated by the filtering rules is as shown in FIG. 8A. The terminal stores the filtering rules. Thus, the judgment value of the leaf node 11 is determined according to whether the filtering condition is satisfied that "film type" is an action film, and the judgment value of the leaf node 12 is determined according to whether the filtering condition is satisfied that "film type" is a disaster film. The filtering rule condition of the root node is the operation "or", the DoubleNodeL of the operation is the node 11, and the DoubleNodeR of the operation is the node 12. The judgment value of the root node is the judgment value obtained by performing an "or" operation with the judgment values of the node 11 and node 12.

The server sends a notification message carrying the description information to the terminal. If the description information is structured description information, the description carried in the notification message is as shown in Table 6. If the structure of the description information is sent to the terminal by the server in advance, the content of the description information carried in the notification message is as shown in Table 7.

TABLE 6

Schematic structured description information

| Parameter-IdentifierLength | Parameter-Identifier | Parameter-Encoding | Parameter-ValueLength | ParameterValue |
|---|---|---|---|---|
| 8 | Film type | Character string | 6 | Action film |
| 8 | Actor name | Character string | 4 | Jackie Chan |
| 8 | Film introduction | Character string | 100 | This story happened in ... |

TABLE 7

Schematic contents of the description information

| ParameterIdentifier | ParameterValue | ParameterEncoding |
|---|---|---|
| Film type | Action film | Character string |
| Actor name | Jackie Chan | Character string |
| Film introduction | This story happened in ... | Character string |

Figure 8B:
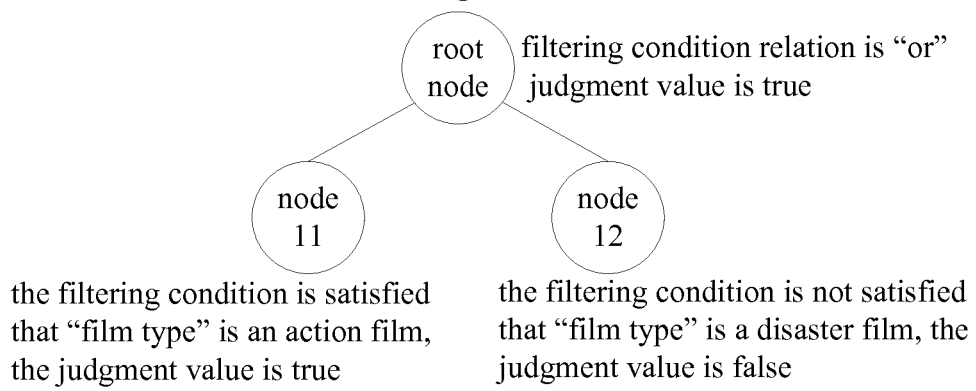
FIG. 8B is a schematic diagram showing a specific example of values of the decision tree according to an embodiment of the present invention.

When receiving the notification message, the terminal extracts the parameters from the description information, and determines whether the parameters satisfy the filtering rules stored. Because the parameter value of the parameter identifier "film type" of the description information carried in the notification message is action film, the filtering condition of the leaf node 11 is satisfied, so the judgment value of the node 11 is true, and the filtering condition of the leaf node 12 is not satisfied, so the judgment value of the node 12 is false. The judgment value obtained by performing an "or" operation with the judgment values of the node 11 and node 12 is the judgment value of the root node. Finally, the judgment value of the root node is true, which indicates that the parameters in the description information satisfy the filtering rule, as shown in FIG. 8B. The terminal displays this notification message to the terminal user. The data structure of the node 11 is as shown in Table 8, the data structure of the node 12 is as shown in Table 9, and the data structure of the root node is as shown in Table 10.

TABLE 8

Schematic data structure of node 11

| Parameter | Data value |
|---|---|
| Node { | |
| JudgeValue | true |
| FilteringConditionRelation | null |
| } | |

TABLE 9

Schematic data structure of node 12

| Parameter | Data value |
|---|---|
| Node { | |
|    JudgeValue | false |
|    FilteringConditionRelation | null |
| } | |

TABLE 10

Schematic data structure of root node

| Parameter | Data value |
|---|---|
| Node { | |
|    JudgeValue | true |
|    FilteringConditionRelation | or |
|    DoubleNodeL | Node 11 |
|    DoubleNodeR | Node 12 |
| } | |

The terminal can not only implement filtering for the notification message according to the parameters in the description information and the filtering rules, but also perform other operations on the notification message according to the description information. For example, the terminal looks for a parameter in the description information. If the parameter can be found in the description information, the terminal processes the notification message, and if the parameter cannot be found in the description information, the notification message is discarded directly. Another example is that the terminal makes statistics on the number of times that the notification message appears, where configured parameter is included in the description information, i.e., when the description information includes the configured parameter, a counter is increased by 1, so as to make statistics on the number of times that the configured parameter appears in the notification message, etc.

Figure 9A:
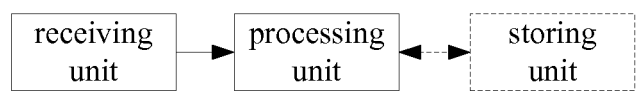
FIG. 9A is a schematic diagram showing structure of a terminal processing a notification message according to an embodiment of the present invention.

In an embodiment of the present invention, the terminal that processes the notification message includes a receiving unit and a processing unit, as shown in FIG. 9A, where the receiving unit is adapted to provide the processing unit with the received notification message that carries description information, and the processing unit is adapted to process the received notification message according to the parameter included in the description information.

When the description information refers to the content of the description information, the terminal further includes a storing unit, where the receiving unit is further adapted to provide the storing unit with the received description information structure; the storing unit is adapted to store the description information structure and provide the processing unit with the description information structure; the processing unit is further adapted to process the content of the description information according to the description information structure, such as determine the parameter value corresponding to the parameter identifier in the description information structure. The receiving unit may further be adapted to provide the storing unit with the received description information structure.

The terminal further includes a storing unit, where the storing unit is adapted to store the filtering rule, and provide the processing unit with the filtering rule. The processing unit is further adapted to process the notification message, such as perform filtering, according to the filtering rule from the storing unit and the parameters in the description information.

On the basis that the receiving unit, processing unit and storing unit are included, the receiving unit is further adapted to provide the processing unit with the information of the received filtering condition list; the processing unit is further adapted to obtain the filtering condition list according to the information of the filtering condition list, analyze the filtering condition list, configure the filtering relation and the relationship between filtering conditions to generate the filtering rule, and provide the storing unit with the generated filtering rule.

Figure 9B:
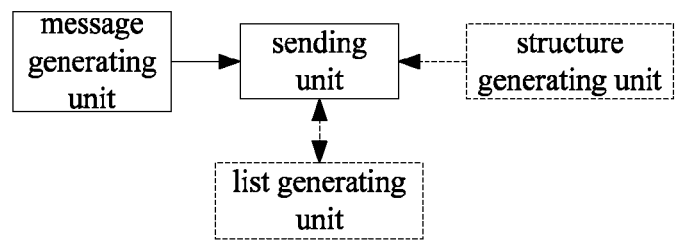
FIG. 9B is a schematic diagram showing structure of a server processing a notification message according to an embodiment of the present invention.

In an embodiment of the present invention, a server that processes the notification message includes a message generating unit and a sending unit, as shown in FIG. 9B. The message generating unit is adapted to add the description information into the notification message, and provide the sending unit with the notification message. The sending unit is adapted to send the notification message carrying the description information. The server further includes a list generating unit, where the list generating unit is adapted to generate the filtering condition list, and provide the sending unit with the information of the filtering condition list. The sending unit is further adapted to send the information of the filtering condition list. When the description information refers to the content of the description information, the server further includes a structure generating unit, where the structure generating unit is adapted to determine the structure of the description information and provide the sending unit with the structure. The sending unit is further adapted to send the structure of the description information.

Figure 9C:
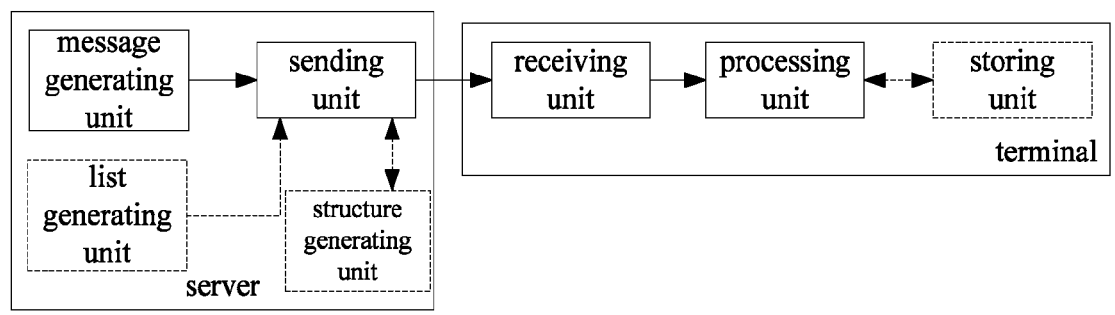
FIG. 9C is a schematic diagram showing structure of a system processing a notification message according to an embodiment of the present invention.

In an embodiment of the present invention, the system that processes the notification message includes a server and a terminal, as shown in FIG. 9C, where the server is adapted to add the description information into the notification message, and send the notification message to the terminal. The terminal is adapted to process the received notification message according to the parameter included in the description information. When the description information refers to the content of the description information, the server is further adapted to determine the structure of the description information and send the structure to the terminal. The terminal is further adapted to store the structure of the description information, and determine the parameter according to the structure of the description information and the content of the description information when the notification message is received. The terminal is further adapted to store the filtering rule, and process the received notification message according to the filtering rule and the parameter included in the description information. The server is further adapted to generate a filtering condition list, and send information of the filtering condition list to the terminal. The terminal is further adapted to obtain the filtering condition list according to the information of the filtering condition list, analyze the filtering condition list, and prompt the terminal user to configure the filtering conditions and the relationship between the filtering conditions, so as to generate the filtering rule.

The terminal includes a receiving unit and a processing unit. The receiving unit is adapted to provide the processing unit with the received notification message that carries the description information, and the processing unit is adapted to process the received notification message according to the parameter included in the description information. When the description information refers to the content of the description information, the terminal further includes a storing unit, where the storing unit is adapted to store the structure of the description information, and provide the processing unit with the structure of the description information. The processing is further adapted to process the content of the description information according to the structure of the description information, such as determine the parameter value corresponding to a parameter value in the structure of the description information. The terminal further includes a storing unit, where the storing unit is adapted to store the filtering rule, and provide the processing unit with the filtering rule. The processing unit is further adapted to process the notification message according to the parameter included in the description information and the filtering rules from the storing unit. On the basis that the receiving unit, processing unit and storing unit are included, the receiving unit is further adapted to provide the processing unit with the information of the received filtering condition list; the processing unit is further adapted to obtain the filtering condition list according to the information of the filtering condition list, analyze the filtering condition list, configure the filtering relation and the relationship between filtering conditions to generate the filtering rule, and provide the storing unit with the generated filtering rule.

The server includes a message generating unit and a sending unit. The message generating unit is adapted to add the description information into the notification message, and provide the sending unit with the notification message. The sending unit is adapted to send the notification message carrying the description information. The server further includes a list generating unit, where the list generating unit is adapted to generate the filtering condition list, and provide the sending unit with the information of the filtering condition list. The sending unit is further adapted to send the information of the filtering condition list. When the description information refers to the content of the description information, the server further includes a structure generating unit, where the structure generating unit is adapted to determine the structure of the description information and provide the sending unit with the structure. The sending unit is further adapted to send the structure of the description information.

It is obvious that various modifications and variations will occur to those skilled in the art without departing from the spirit and scope of the present invention. Therefore, when such modifications and variations of the present invention fall within the scope of the claims of the present invention and the equivalent technology, they are intended to be included by the present invention.

The invention claimed is:

1. A method for processing a notification message, comprising:
   receiving, by a terminal, a structure of description information from a server;
   receiving, by the terminal, a notification message carrying description information from the server, wherein the description information comprises a parameter;
   determining, by the terminal, an identifier of the parameter and a parameter value corresponding to the identifier of the parameter according to the structure of the description information; and
   wherein the receiving the structure of description information from the server comprises:
   obtaining, by the terminal, the structure of the description information via a Uniform Resource Identifier, URI or Uniform Resource Locator, URL, and storing the structure, wherein a file of an Auxiliary Data structure in an electronic service guide, ESG, comprises the structure of the description information, or a file in a server comprises the structure of the description information, and the URI or URL of the file being carried in the parameter MediaLocator or service fragment parameter in the data structure of the relevant content of ESG that is sent to the terminal; or
   obtaining, by the terminal, the structure of the description information directly, and storing the structure, wherein the parameter MediaLocator or service fragment parameter in the data structure of the relevant content of ESG that is sent to the terminal comprises the structure of the description information.

2. The method according to claim 1, wherein the method further comprises:
   storing, by the terminal, a filtering rule; and
   filtering, by the terminal, the notification message according to the parameter comprised in the filtering rule and the description information.

3. The method according to claim 2, wherein the storing, by the terminal, the filtering rule comprises:
   obtaining, by the terminal, a filtering condition list via the server, and configuring the filtering rule according to the filtering condition list; or
   configuring, by the terminal, the filtering rule directly, and storing the filtering rule; or
   receiving, by the terminal, directly the filtering rule provided by the server.

4. The method according to claim 3, wherein the obtaining, by the terminal, the filtering condition list via the server comprises:
   providing, by the server, the terminal with the filtering condition list directly; or
   sending, by the server, an address of a file containing the filtering condition list to the terminal, and obtaining, by the terminal, the filtering condition list according to the address of the file.

5. The method according to claim 2, wherein when the terminal filters the notification message according to the filtering rule and the parameter comprised in the description information, the method further comprises:
   storing or displaying, by the terminal, the notification message that comprises the parameter satisfying the filtering condition.

6. A terminal for processing a notification message comprising:
   a processor device for executing instructions, comprising:
   a receiving unit, configured to receive a structure of description information and a notification message carrying description information from a server, wherein the description information comprises a parameter and wherein receiving the structure of description information from the server comprises: obtaining, by the terminal, the structure of the description information via a Uniform Resource Identifier, URI or Uniform Resource Locator, URL, and storing the structure, wherein a file of an Auxiliary Data structure in an electronic service guide, ESG, comprises the structure of the description information, or a file in a server comprises the structure of the description information, and the URI or URL of the file being carried in the parameter MediaLocator or service fragment parameter in the data structure of the relevant content of ESG that is sent to the terminal; or obtaining, by the terminal, the structure of the description information directly, and storing the structure, wherein the parameter MediaLocator or service fragment parameter in the data structure of the relevant content of ESG that is sent to the terminal comprises the structure of the description information; and
   a processing unit, configured to determine an identifier of the parameter and a parameter value corresponding to the identifier of the parameter according to the structure of the description information.

7. The terminal according to claim 6, wherein the terminal further comprises a storing unit, and
- the storing unit is configured to store a filtering rule; and
- the processing unit is further configured to filter the notification message according to a filtering rule and the parameter of the description information.

8. The terminal according to claim 7, wherein:
the receiving unit is further configured to receive information of a filtering condition list; and
the processing unit is further configured to obtain the filtering condition list according to the information of the filtering condition list, configure filtering conditions as well as a relationship between the filtering conditions, and generate the filtering rule.

9. A system for processing a notification message, comprising a server and a terminal, wherein:
the server, having at least a processor device for executing instructions, is configured to send a structure of description information and a notification message carrying the description information to the terminal, wherein the description information comprises a parameter; and
the terminal, having at least a processor device for executing instructions, is configured to receive the structure of the description information and the notification message, and determine an identifier of the parameter and a parameter value corresponding to the identifier of the parameter according to the structure of the description information, wherein the receiving the structure of description information comprises: obtaining, by the terminal, the structure of the description information via a Uniform Resource Identifier, URI or Uniform Resource Locator, URL, and storing the structure, wherein a file of an Auxiliary Data structure in an electronic service guide, ESG, comprises the structure of the description information, or a file in a server comprises the structure of the description information, and the URI or URL of the file being carried in the parameter MediaLocator or service fragment parameter in the data structure of the relevant content of ESG that is sent to the terminal; or obtaining, by the terminal, the structure of the description information directly, and storing the structure, wherein the parameter MediaLocator or service fragment parameter in the data structure of the relevant content of ESG that is sent to the terminal comprises the structure of the description information.

10. The system according to claim 9, wherein:
the terminal is further configured to store a filtering rule, and filter the notification message received according to the filtering rule and the parameter contained in the description information.

11. The system according to claim 10, wherein:
the server is further configured to generate a filtering condition list, and send information of the filtering condition list to the terminal; and
the terminal is further configured to obtain the filtering condition list according to the information of the filtering condition list, analyze the filtering condition list, and prompt a terminal user to configure filtering conditions and a relationship between the filtering conditions, so as to generate the filtering rule.

* * * * *